June 20, 1967  J. ALLEAUME  3,325,953
FOLDED CORRUGATED SHEET-LIKE CORNER PIECE
Filed Aug. 13, 1965  8 Sheets-Sheet 1

Inventor
Jean ALLEAUME
By: Nolte & Nolte
ATTORNEYS

June 20, 1967  J. ALLEAUME  3,325,953
FOLDED CORRUGATED SHEET-LIKE CORNER PIECE
Filed Aug. 13, 1965  8 Sheets-Sheet 2

Fig. 3.

Inventor
Jean ALLEAUME
By: Nolte & Nolte
ATTORNEYS

June 20, 1967   J. ALLEAUME   3,325,953
FOLDED CORRUGATED SHEET-LIKE CORNER PIECE
Filed Aug. 13, 1965   8 Sheets-Sheet 3

Inventor
Jean ALLEAUME
By: Nolte & Nolte
ATTORNEYS

Fig. 6.

June 20, 1967   J. ALLEAUME   3,325,953
FOLDED CORRUGATED SHEET-LIKE CORNER PIECE
Filed Aug. 13, 1965   8 Sheets-Sheet 7

Inventor
Jean ALLEAUME
By: Nolte & Nolte
ATTORNEYS

Fig. 13.

United States Patent Office 3,325,953
Patented June 20, 1967

3,325,953
FOLDED CORRUGATED SHEET-LIKE CORNER PIECE
Jean Alleaume, Saint-Cloud, France, assignor to Technigaz, Paris, France, a corporation of France
Filed Aug. 13, 1965, Ser. No. 479,569
Claims priority, application France, Aug. 17, 1964, 985,386
12 Claims. (Cl. 52—276)

The present invention is a continuation-in-part of applicant's co-pending patent application Ser. No. 375,534, filed June 16, 1964, entitled, "Folded Corrugated Sheet-Like Corner Piece."

It is the essential object of the present invention to provide improvements and modifications in the angular connecting device, constituting a dihedral piece with corrugated or pleated faces, described in the parent patent application and notably but not exclusively certain forms of embodiment of said device.

In the parent patent application there is described more particularly a corner piece comprising corrugations of substantially identical contours, preferably substantially parallel to each other and extending at right angles to the edge of the main dihedron of said piece, all of said corrugations projecting from the two general faces of said main dihedron. In this configuration each wave had a dihedral shape substantially symmetrical in relation to a plane passing through the edge of the wave crest and at right angles to the edge of said main dihedron. The geometrical configuration of the connecting zone between two corresponding waves of the two general faces of the main dihedron was such that on the one hand it met the requirement of non-variance of the angle of said main dihedron during the opening and closing movements of said waves in case of expansions and contractions of the aforesaid piece in a direction substantially parallel to the edge of said main dihedron, and that on the other hand no material projected beyond the plane or surface of the general faces of said main dihedron on the projecting side of said dihedron.

It is the essential object of the present continuation-in-part to extend and generalize the principles on which the construction of the aforesaid corner pieces is based to most of the various cases likely to arise in practice and the device according to this continuation-in-part is remarkable notably in that the main dihedron constituting the aforesaid corner piece is either sunk or projecting and that the aforesaid waves, which are either dihedral or prismatic, are either all convex or projecting, or all concave or hollow on the two general faces of said main dihedron, or all in relief on one face and all hollow on the other face. As a result, the corner piece according to the present continuation-in-part may advantageously be utilized in the following three cases of connection of two corrugated sheets or the like:

(1) Connecting two sheets having both relief corrugations;
(2) Connecting two sheets having both sunk or hollow corrugations;
(3) Connecting two sheets having the one relief corrugations and the other hollow or sunk corrugations.

The corner pieces according to the present continuation-in-part are preferably shaped with a view to preserve the geometrical requirement of non-variance of the angle of the aforesaid main dihedron, whether the sheet material projects or not from the outer or possibly projecting side of the main dihedron. To this effect, and according to another characteristic feature of the present continuation-in-part, in the case preferably of a sunk main dihedron each wave of a general face aforesaid is connected to the corresponding wave of the other face by means of a projecting wave portion coincident with said wave or resulting from a folding transformation of this wave portion, the edges of said wave portion, which bound each one of their endmost lateral small faces, converging to the point of intersection of the base edge of said wave with the edge of said main dihedron, the two corresponding relief wave portions of the two faces being interconnected by a prismatic or dihedral broken and sunk junction surface forming an impression in one of the two wave portions, said wave portions together with said junction surface having a geometrical nature at least similar to one of said waves, whilst the crest edges or trough edges of the two corresponding waves, the crest edges of the two relief wave portions and the trough edges of said broken junction surface correspond to one another and are located in common planes.

In practice, it will be advantageous to utilize either dihedral waves, that is, having a triangular cross-sectional contour or a plane angle, or a three-faced prismatic contour, that is, a polygonal, rectangular, square or trapezoidal cross-sectional contour.

Other features and advantages of the present continuation-in-part will appear as the following detailed description proceeds with reference to the attached drawings given by way of example and wherein:

FIGURE 5 is an elevational view from the left-hand side of the folded device of FIGURE 3, assuming that the angle of aperture of the waves is zero, that is, with their small faces coincident with each other;

FIGURE 6 is a perspective view showing a corner piece element comprising a corrugation of which one wave projects from, or is in relief on one general face of the main dihedron and the other corresponding wave is hollow on the other face of said dihedron;

Figure 1:
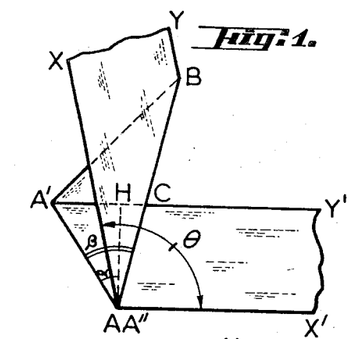
FIGURE 1 illustrates in side elevational view or from the left-hand side the device shown in FIGURE 3 of the parent patent application, with dihedral waves projecting from both faces of the main sunk dihedron, in the hypothesis of a zero-aperture angle of said waves and assuming that the sheet metal is infinitely thin to simplify the geometrical figure.
Figure 2:
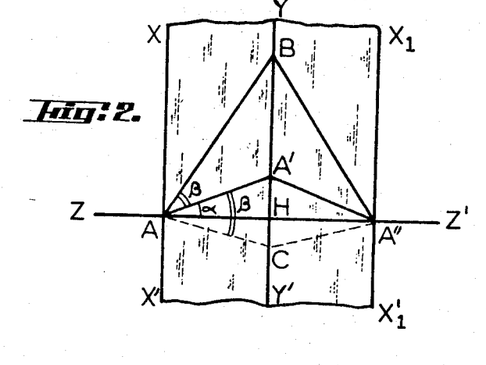
FIGURE 2 illustrates the plane development or flat unfolding of the configuration shown in FIGURE 1, in a manner similar to FIGURE 2 of the parent patent application.

The form of embodiment illustrated in FIGURES 1 and 2 of the drawings relates to the device described in the parent patent application which comprises dihedral waves, or waves having a triangular contour or a plane angle in cross-section, these waves being all in relief that is projecting from the inside of the two general faces of the aforesaid hollow or sunk main dihedron. In this case each aforesaid relief wave portion as described hereinabove merges into the wave end adjacent to the edge AA″ of the main dihedron. In this case the junction surface mentioned hereinabove consists of a dihedral surface BAA′A″ having triangular small faces BAA′ and BA′A″ with a vertex A or A″ located at the point of convergence of the edge AA″ of the main dihedron with the base edge XAX, or $X_1AX'_1$ of the corrugation. This dihedral surface results from the transformation of the projecting fold of the crest edge yB of the relief wave associated therewith into a sunk fold BA′ by reversing the folding direction, whereby the edge of this dihedral surface lies in the plane of symmetry of the corrugation and does not meet, in the configuration folded in the space, the edge AA″ of the main dihedron.

FIGURE 1 illustrates the most general case corresponding more particularly to the case wherein material projects at point A′ outside from the plane XA of the corresponding general face of the main dihedron, on the projecting side thereof. If $\theta$ is the angle of the main dihedron, the geometrical relationship between various corresponding angles of FIGURES 1 and 2, whereby the non-variance requirement of the angle of the main dihedron may be expressed, can be established very simply as follows:

By definition, let us assume that:

$$\widehat{xAx'} = \theta$$

$$\widehat{A''AA'} \equiv \widehat{HAA'} = \alpha \text{ with } \widehat{AHA'} = \frac{\pi}{2}$$

$$\widehat{CAA'} \equiv \widehat{BAA'} = \beta$$

(assuming that the wave has a zero aperture angle)

Then we have:

$$\widehat{BAx} = \widehat{ABA'} = \widehat{xAA''} - (\widehat{A'AA''} + \widehat{BAA'}) \text{ (see Figure 2)}$$

or $$\widehat{BAx} = \frac{\pi}{2} - \alpha - \beta$$

$$\widehat{x'AA'} = \widehat{x'AA''} + \widehat{A'AA''} = \frac{\pi}{2} + \alpha$$

From the foregoing it appears that (FIGURE 1):

$$\theta = \widehat{xAx'} = \widehat{x'AA'} - \widehat{A'AB} + \widehat{BAx} =$$

$$\frac{\pi}{2} + \alpha - \beta + \frac{\pi}{2} - \alpha - \beta = \pi - 2\beta$$

whence $\theta = \pi - 2\beta$

If the main dihedron is straight: $\theta = \pi/2$ whence $\beta = \pi/4$.

To avoid the projection of material, it is necessary that the point A′ lies on the straight line xA of FIGURE 1, which implies that:

$$\widehat{BAx} = \widehat{BAA'} \text{ or } \frac{\pi}{2} - \alpha - \beta = \beta$$

or $$2\beta - \alpha \frac{\pi}{2}$$

In the specific case contemplated hereinabove, where $\theta = \pi/2$ we have $\alpha = 0$.

Figures 3, 4:
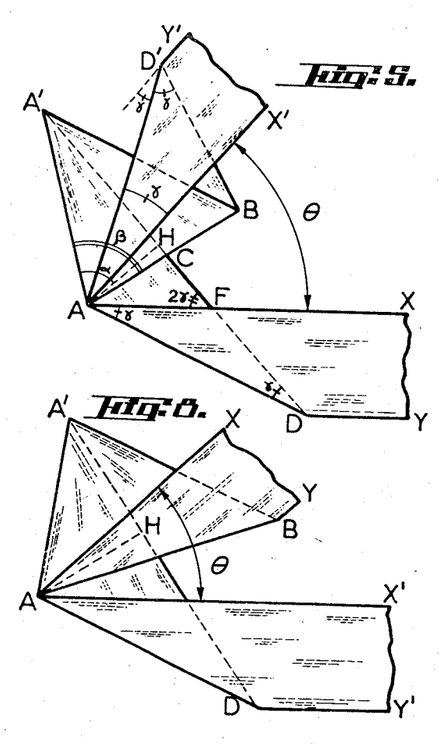
FIGURE 3 illustrates in perspective view one portion of a corner piece containing a corrugation which is sunk on both general faces of the main hollow dihedron.
FIGURE 4 is the plane development or flat unfolding corresponding to FIGURE 3.
Figure 3:
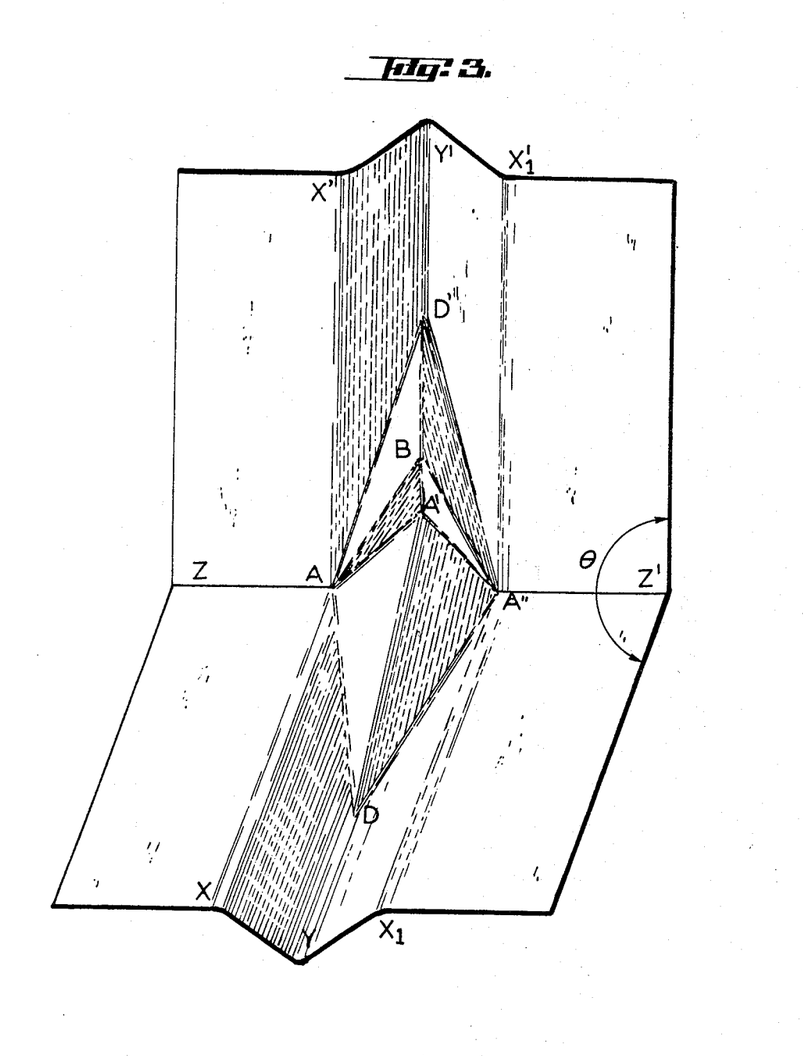
Figure 4:
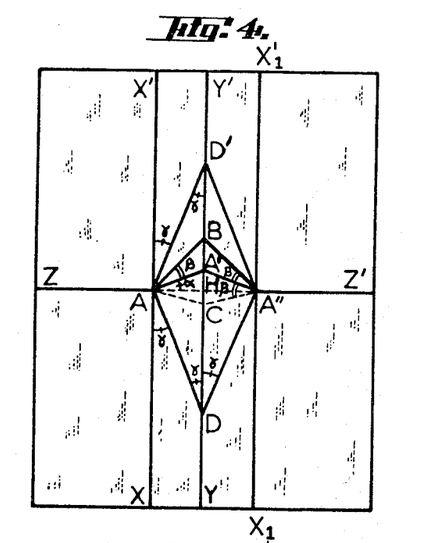

FIGURES 3, 4 and 5 illustrate the case in which the waves of the aforesaid corner piece have a general dihedral configuration and are all hollow or sunk on that is projecting from the outside of the two general faces of the aforesaid hollow main dihedral. In this case, two corresponding hollow waves located respectively in the two general faces of the main dihedron are interconnected by means of two relief wave portions respectively (i.e. which projects toward the inside of said dihedron), of which each one consists of a limited connecting dihedral surface such as BAD′A″ and A′ADA″ having triangular small faces such as BAD′ and BA″D′ for one of the two dihedral surfaces, and A′AD and A′A″D for the other dihedral surface. Each one of these connecting dihedral surfaces results from the transformation of the sunk fold of the trough edge y′D′ and yD of the associated hollow wave into a projecting fold BD′ and A′D by reversing the direction in which said hollow or trough edges are folded. Thus, the preceding case of FIGURES 1 and 2 is obtained again, with all the waves D′B and A′D in relief on the two general faces of the main dihedron, whereby the two aforesaid connecting dihedral surfaces are interconnected by means of a sunk dihedral junction surface BAA′A″ as in the preceding example.

The corner piece of FIGURE 3 is folded along the following lines:

(1) Inward or concave folds forming the edges of reentrant dihedral surface portions, that is projecting outwards from the outside faces ZAX′ and ZAX of the dihedral angle $\theta$:

YD, DA and DA″
Y′D′, D′A and D′A″
BA′, A′A and A′A″
AZ and A″Z′

(2) Outward or convex folds forming the edges of salient dihedral surface portions, that is projecting inwards from the inside faces of said dihedral angle $\theta$:

XAX′ and $X_1A''X'_1$
DA′ and D′B
BA and BA″

The geometrical relationship between the various angles of the solid folded in the space, as they appear in FIGURES 4 and 5, is easy to establish in the case of a zero angle of wave aperture.

Referring now to the symbols carried by these FIGURES 4 and 5, and assuming that points D and D′ are equally spaced from the edge ZZ′ of the main dihedron, we have:

$$\widehat{HAA'} = \alpha \widehat{BAA'} = \beta$$

$$\widehat{ADA'} = \widehat{A'DA''} = \widehat{xAD} = \alpha$$

In the triangle $$\widehat{DAA'}$$

we have:

$$\widehat{AA'H} = \frac{\pi}{2} - \alpha$$

whence $$\widehat{DAA'} = \pi - (\widehat{AA'D} + \widehat{ADA'}) = \pi -$$

$$\left[\left(\frac{\pi}{2} - \alpha\right) + \gamma\right] = \frac{\pi}{2} + \alpha - \gamma$$

On the other hand:

$$\theta \equiv \widehat{xAx'} = \widehat{xAB} + \widehat{BAx'}$$

and $$\widehat{DAA'}=\widehat{DAx}+\widehat{xAB}+\widehat{BAA'}$$

or still $$\frac{\pi}{2}+\alpha-\gamma=\gamma+\widehat{xAB}+\beta$$

whence:

$$\widehat{xAB}=\frac{\pi}{2}+\alpha-\beta-2\gamma$$

On the other hand:

$$\widehat{BAx'}=\widehat{BAD'}-\widehat{x'AD'}=\widehat{BAD'}-\gamma$$

now $$\widehat{BAD'}=\frac{\pi}{2}-(\alpha+\beta+\gamma)$$

from FIGURE 4, therefore $$\widehat{BAx'}=\frac{\pi}{2}-\alpha-\beta-2\gamma$$

and finally $$\theta=\frac{\pi}{2}+\alpha-\beta-2\gamma+\frac{\pi}{2}-\alpha-\beta-2\gamma$$

that is to say, $$\theta=\pi-2\beta-4\gamma$$

If it is desired that $\theta=\pi/2$, the following equality must be obtained:

$$\beta+2\gamma=\pi/4$$

Figure 7:
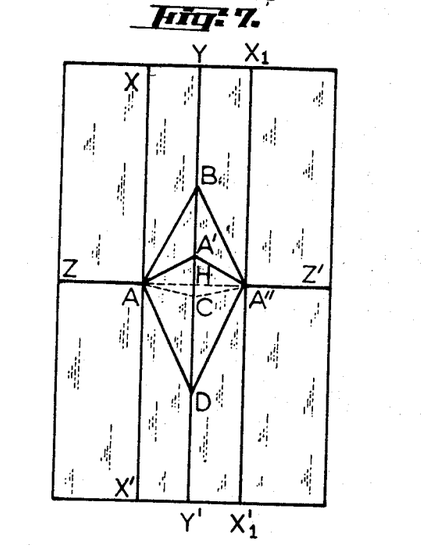
FIGURE 7 is the plane development of the device illustrated in FIGURE 6.
Figure 8:
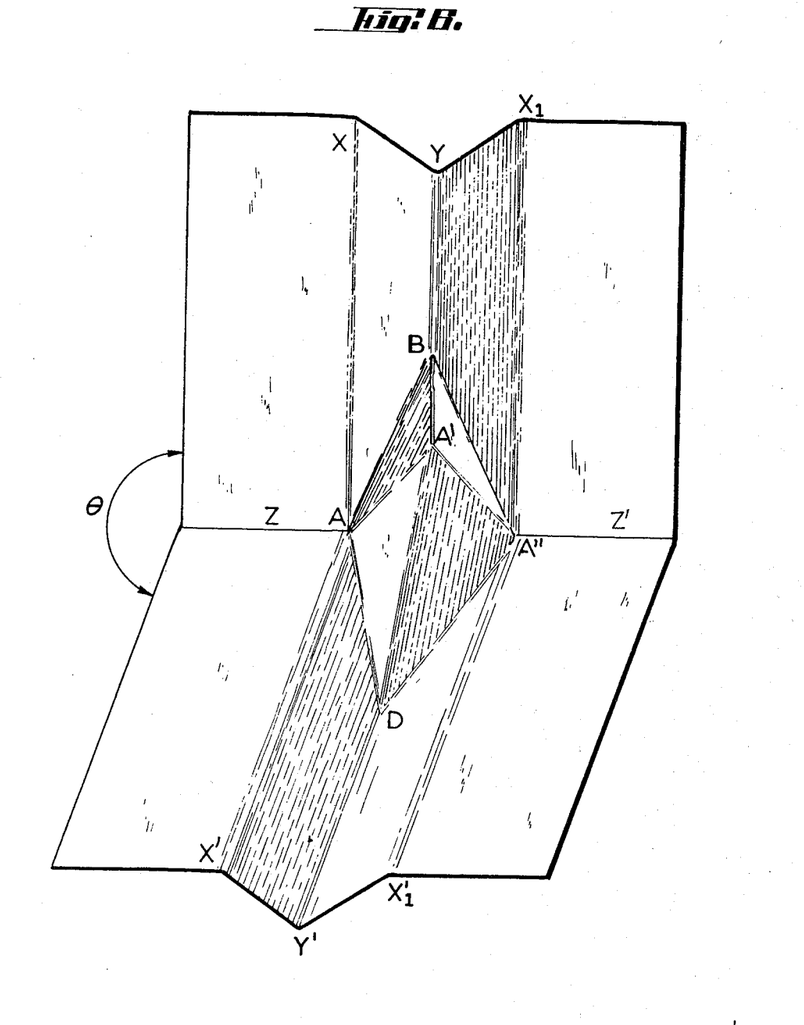
FIGURE 8 is a side elevational view from the left-hand side of the device shown in FIGURE 7, in the hypothesis of a zero wave aperture angle.

FIGURES 6, 7 and 8 show the case of a corner piece wherein all the waves of a general face ZAX of the main dihedron are in relief on the hollow side of said main dihedron while all the waves of the other general face ZAX' of said main dihedron are hollow, that is, in relief on the projecting side of said dihedron. In the preceding examples it is shown that as a rule it is preferred to design or make the folding steps in such a way that there always are projecting or relief waves to be merged into each other in the vicinity of the edge ZZ' of the main dihedron. Therefore, as a result in the preceding example, the end portion of the hollow wave must necessarily be converted into a relief wave portion such as shown at DAA'A" having two triangular small faces DAA' and DA"A' of which one vertex A, A" lies respectively on the edge ZZ' of the main dihedron at its intersection with the edges of the bases XAX' and $X_1A''X'_1$. The problem of connecting one relief wave with a hollow wave will then consist in connecting two relief waves YB and DA' according to the example shown in FIGURES 1 and 2, and it has been shown hereinabove that this connection is obtained by means of a sunk or hollow dihedral junction surface A'ABA" resulting from the reversing of the folding direction of the crest edge YB of the relief wave along a trough edge or sunk fold BA'.

FIGURES 9 to 14 inclusive illustrate the case in which the dihedral waves of the preceding examples are replaced with prismatic waves (i.e. formed by a surface consisting of a plurality of successive flat lateral faces joined to each other along respective parallel edge lines), for example three-faced waves, so that the cross-sectional contour of each wave is a polygonal contour of trapezoidal, rectangular or square configurations. This prismatic wave is advantageous in that it has a greater flexibility in the direction of the edges of the dihedral wave. These prismatic waves have been described notably in previous patents.

In the case of such three-faced prismatic waves the connecting relief wave portions and the broken junction surfaces of the preceding examples with dihedral waves are converted in this alternate form of embodiment in a corresponding manner into three-faced prismatic surfaces.

Figure 9:
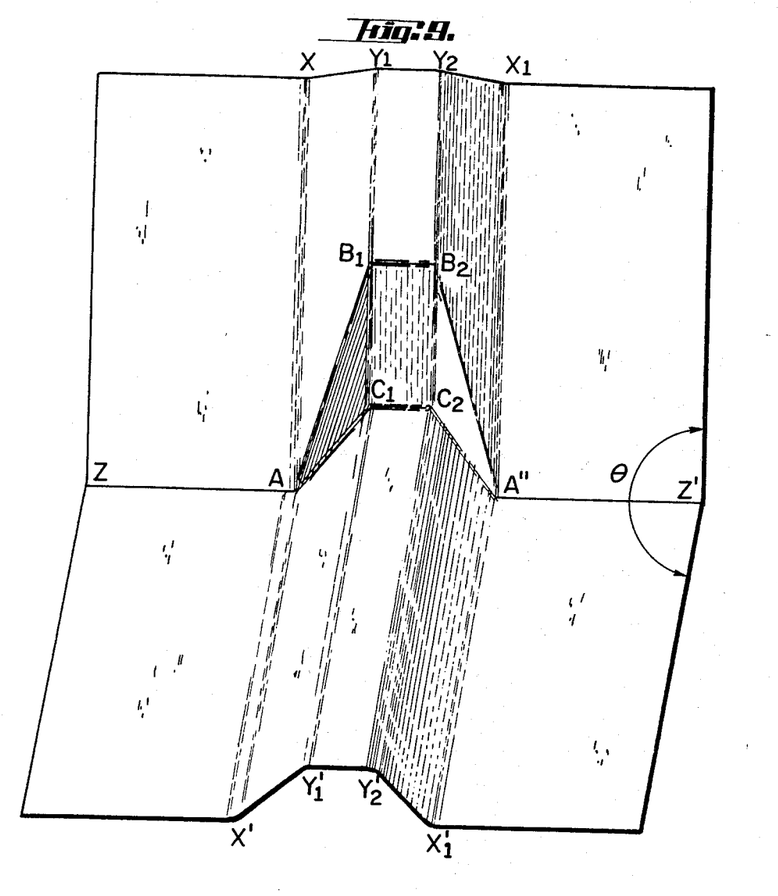
FIGURE 9 is a perspective view of a corner piece element comprising a prismatic corrugation having three small faces projecting from the two general faces of the main dihedron.
Figure 10:
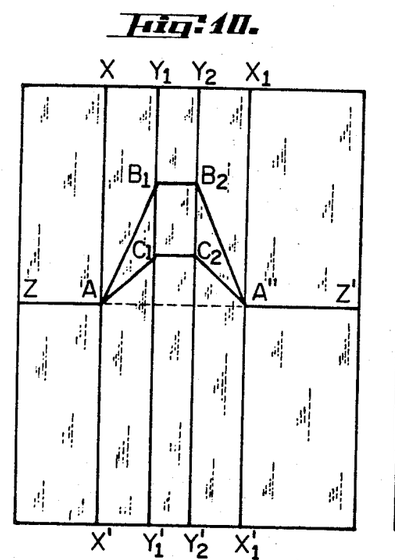
FIGURE 10 is the plane development of the device shown in FIGURE 9.

Thus, FIGURES 9 and 10 relate to the angular connection of two relief waves and this example compares completely with that of FIGURES 1 and 2 showing relief dihedral waves. The prismatic junction surface between the two prismatic relief waves result in this case from the transformation of the convex folds of the two crest edges of the relief wave concerned into two concave folds by reversing the folding direction or, in other words, converting the end portion of the relief wave into a prismatic hollow wave.

The corner piece is folded along the following lines:

(1) Inward or concave folds forming the edges of re-entrant dihedral surface portions, that is projecting outwards from the outside faces of the dihedral angle $\theta$:

XAX' and $X_1A''X'_1$
ZA and Z'A"
$B_1C_1$ and $B_2C_2$
$AC_1$ and $A''C_2$ (2) Outward or convex folds forming the edges of salient dihedral surface portions, that is projecting inwards from the inside faces of said dihedral angle $\theta$:

$Y_1B_1$ and $Y_2B_2$
$AB_1$, $B_1B_2$ and $B_2A''$
$C_1Y'_1$ and $C_2Y'_2$

As already shown in the parent patent application, if it is desired that no sheet material projects outwards at the broken edge line $AC_1C_2A''$ from the outside lateral face ZAX of the dihedron, the dihedral angle $\theta$ of the corner piece should be in the range of from 60° inclusive to 180° inclusive.

Figure 11:
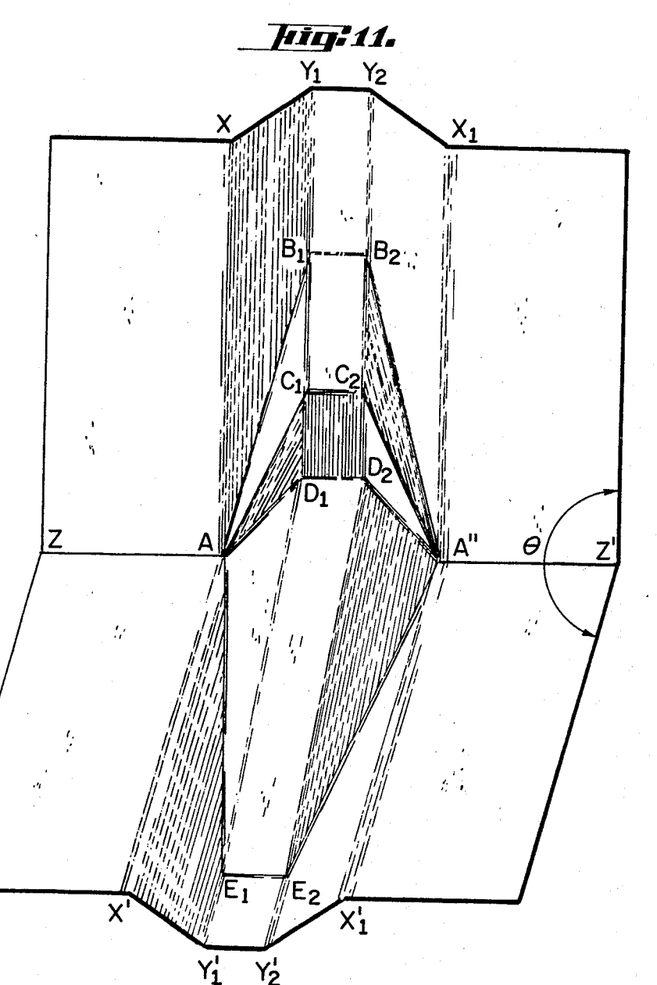
FIGURE 11 is a perspective view showing a corner piece element comprising a prismatic corrugation having three small faces sunk on the two geenral faces of the main dihedron.
Figure 12:
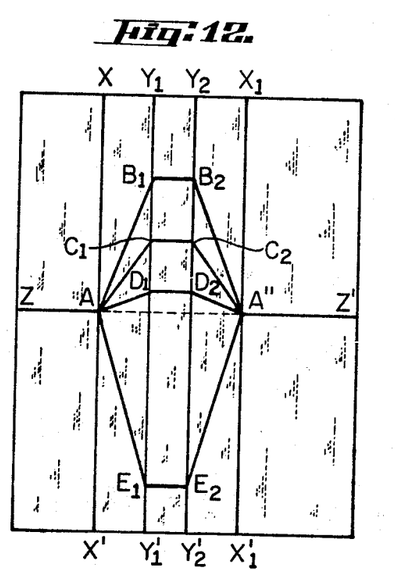
FIGURE 12 illustrates the plane developed view of the device of FIGURE 11.

FIGURES 11 and 12 relates to the specific case of the interconnection of two hollow prismatic waves and this case compares completely with that of FIGURES 3 to 5 concerning hollow dihedral waves. In this case too the adjacent ends of the hollow prismatic waves are converted, by reversing the folding direction of the trough edges of these waves, into portions of relief prismatic waves interconnected by means of a prismatic junction surface similar to that of the preceding example illustrated in FIGURES 9 and 10.

The corner piece is folded along the following lines:

(1) Inward or concave folds forming the edges of re-entrant dihedral surface portions, that is projecting outwards from the outside faces of the dihedral angle $\theta$:

$Y_1B_1$ and $Y_2B_2$
$B_1A$, $B_1B_2$ and $B_2A''$
$C_1D_1$ and $C_2D_2$
$D_1A$, $D_1D_2$ and $D_2A''$
$E_1A$, $E_1E_2$ and $E_2A''$
$Y'_1E_1$ and $Y'_2E_2$
ZA and Z'A"

(2) Outward or convex folds forming the edges salient dihedral surface portions, that is projecting inwards from the inside faces of the dihedral angle $\theta$:

XAX' and $X_1A''X'_1$
$C_1A$, $C_1C_2$ and $C_2A''$
$E_1D_1$ and $E_2D_2$

Figure 13:
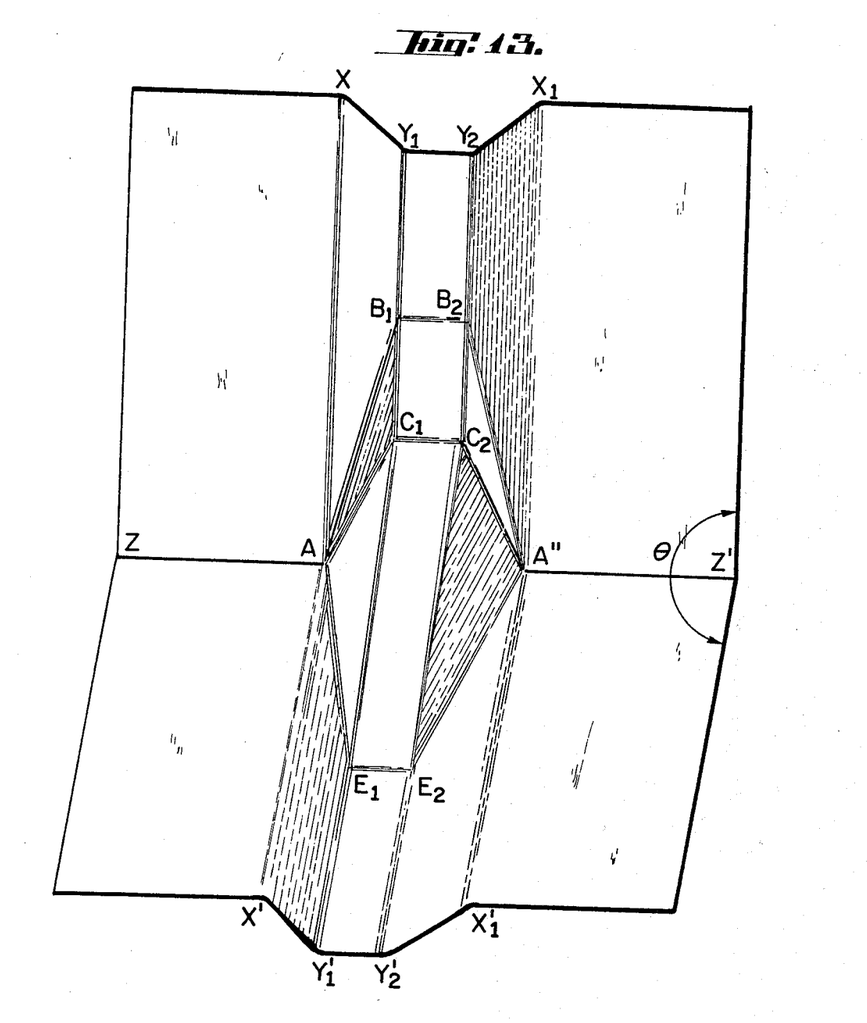
FIGURE 13 is a perspective view of a corner piece element comprising a prismatic corrugation having three small faces which project from one of the general faces of the main dihedron and is sunk on the other face of said dihedron.
Figure 14:
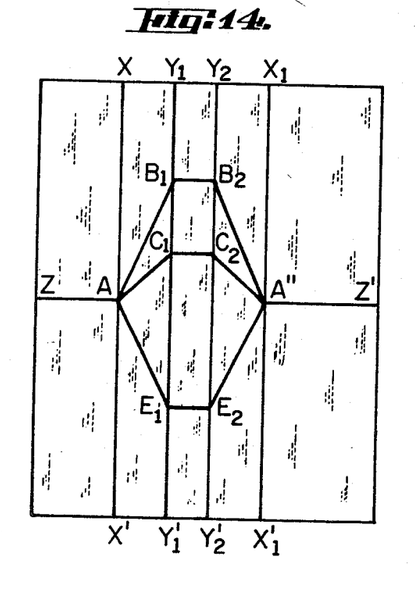
FIGURE 14 is the plane development of the device illustrated in FIGURE 13.

Finally, FIGURES 13 and 14 relate to the specific case of the connection of a relief prismatic wave with a hollow prismatic wave and this example compares completely with that concerning dihedral waves illustrated in FIGURES 6 to 8. In this case, and according to the principles set forth hereinabove, the end portion of the hollow wave is transformed, by reversing the folding direction of the trough wave edges, into a relief prismatic wave portion merging into the corresponding relief wave on the other face of the main dihedron, through the medium of the prismatic junction surface.

The corner piece is folded along the following lines:

(1) Inward or concave folds forming the edges of reentrant dihedral surface portions, that is projecting outwards from the outside faces of said dihedral angle $\theta$:

XA and $X_1A''$
ZA and $Z'A''$
$B_1C_1$, $C_1C_2$ and $B_2C_2$
$Y'_1E_1$ and $Y'_2E_2$
$E_1A$, $E_1E_2$ and $E_2A''$ (2) Outward or convex folds forming the edges of salient dihedral surface portions, that is projecting inwards from the inside faces of said dihtdral angle $\theta$:

$Y_1B_1$ and $Y_2B_2$
$B_1A_1$, $B_1B_2$ and $B_2A''$
$X'A$ and $X'_1A''$
$E_1C_1$ and $E_2C_2$ The geometrical relationships between angles, which are established notably in connection with the first and second examples concerning dihedral waves, are completely transposable to the corresponding cases concerning prismatic waves, in the specific hypothesis of a zero angle of wave aperture, which corresponds to prismatic waves of rectangular or square configuration, that is, of which the two lateral small faces, adjacent to each other on either side of the crest small face, are substantially parallel.

The above-described examples relate to the sunk or trough side of the main dihedron, but they are exactly applicable to the case wherein the projecting side of the main dihedron were considered.

Of course, the present continuation-in-part should not be construed as being limited by the specific forms of embodiment shown and described herein since these are given by way of example only.

What I claim is:

1. A corner piece construction forming a folded angular member of corrugated sheet metal stock for connecting together, at any substantially dihedral angle between 0° and 180°, two adjacent similarly corrugated sheet-like plate elements having at least one set of substantially parallel spaced corrugations extending at least endwise substantially at right angles to the edge of said dihedral angle, said corner piece being formed with at least one set of at least one integral channel-like corrugation, each one of which has a substantially prismatic wave portion of substantially uniform cross-sectional polygonal contour, extending substantially at right angles to the edge of said dihedral angle and adjacent, along its length, to a pair of substantially flat, smooth, uncorrugated areas located on both sides of said wave portion, respectively, in substantially the same plane, said corner piece being folded on the one hand along at least one set of at least three spaced lines substantially straight and parallel to the corrugations of said elements to define said wave portion by at least one crest fold line and two base fold lines the crest and base folds having their cross-sections convex in opposite directions with respect to the lateral faces of said dihedral angle, and on the other hand along one cross-sectionally concave fold line as viewed from the inside of said dihedral angle 27 substantially at right angles to the first-named lines to form the edge of a dihedron having said dihedral angle, thereby dividing said wave portion into two parts pertaining to two lateral faces respectively, of said dihedron, and projecting therefrom, and further along at least four folding lines from the respective neighbouring ends of the crests of said wave parts, two or either side of the latter, each one of the pairs of said folding lines converging to a point where the base fold lines of said wave parts meet the edge fold line of said dihedral angle, so that the crest of each wave part divides from its end into two sections falling down to said edge fold line, so that at least one wave part terminates at an angle to its extent by having a crest end portion thereof bent toward the inside and base of and lying within said wave part and having thus its cross-sectional convexity direction reversed with respect to that of said wave part, thereby defining a common intersecting region connecting both wave parts and consisting of a polyhedral surface portion bounded by said folding lines which forms two interpenetrating ridge sections of convex cross-sectional contour towards the inside of said dihedral angle and having on each one a top issuing from the crest of the associated wave part and defined by at least one convex fold line lying, together with the corresponding crest fold line of the associated wave part, in a same plane substantially perpendicular to the edge of said dihedral angle.

2. A corner piece according to claim 1, wherein each corrugation is substantially symmetrical with respect to the plane passing through the crest centre line thereof and substantially perpendicular to the edge of said dihedral angle.

3. A corner piece according to claim 2, wherein each corrugation consists of two raised wave parts projecting both from the inside of the lateral faces of said dihedron, respectively, and bounded by concave base fold lines therein, said ridge sections coinciding with and forming the terminal portions proper of said wave parts, respectively, whereby the crest end of one wave part is connected to that of the other wave part by an inward bent crest end portion of said one wave part, forming a cross-sectionally concave polyhedral surface comprising on each side one extreme triangular face bounded by one convex folding line joining one crest fold line end of said one wave part to the edge fold line of said dihedron and by two concave folding lines issuing from one corresponding crest fold line end of said other wave part and joining said crest fold line end of said one wave part and said edge fold line of said dihedron, respectively, whereby said other wave part extends endwise into said one wave part.

4. A corner piece according to claim 3, wherein said dihedral angle is in the range of from 60° inclusive to 180° inclusive, so that the end of the crest of said other wave part penetrating said one wave part, reaches at most a point lying in the same plane as the base fold lines of said one wave part when the two extreme lateral faces of each wave part on either side thereof, respectively, are substantially parallel to each other so that no materal projects from said plane toward the outside of said dihedral angle.

5. A corner piece according to claim 2, wherein each wave part has substantially the shape of a salient dihedral surface portion, the edge of which forms the crest thereof, which divides from its end into two sections falling down and away from each other along the two aforesaid convex folding lines; whereas the crest of said other wave part divides from its end into two sections falling down and away from one another along the two aforesaid concave folding lines, said inward bent crest end portion of said one wave part forming a re-entrant dihedral surface portion, the concave edge fold line of which connects the crest ends of both wave parts thereby defining a common intersecting region in the shape of a tetrahedral re-entrant angle as viewed from the inside of said dihedron, the vertex of said tetrahedral re-entrant angle being the common meeting point of said concave edge fold line and of said two concave folding lines.

6. A corner piece according to claim 2, wherein each wave part has a convex quadrangular cross-sectional contour formed by three lateral faces comprising two side faces and a flat crest face defined by two convex crest fold lines, the crest end of said one wave part being defined by a transverse cross-sectionally convex fold line whereas the crest end of said other wave part is defined by a transverse cross-sectionally concave fold line, so that both crest fold line ends of said one wave part which is penetrated by the other, are joined by said two cross-sectionally convex folding lines, respectively, to the edge fold line of said dihedron, whereas both crest line ends of said other wave part are joined to said edge fold line of said dihedron by two cross-sectionally concave folding lines, respectively, whereby the crest ends of both wave parts are connected by a flat rectangular surface laterally bounded by two cross-sectionally concave folding lines connecting the corresponding crest line ends, respectively, said rectangular surface pertaining to said inward bent crest end portion, said cross-sectionally concave polyhedral surface therefore comprising one rectangular intermediate face lying between two triangular side faces adjacent thereto.

7. A corner piece according to claim 2, wherein each corrugation consists on the one hand of one raised wave part bounded by concave base fold lines and projecting from the inside of one lateral face of the dihedron formed by said corner piece, and on the other hand of one hollow wave part bounded by convex base fold lines and projecting from the outside of the other lateral face of said dihedron, one of said ridge sections coinciding with and forming the terminal portion proper of said raised wave part, the crest ends of said wave parts being connected by two interconnected crest end portions bent inwards of said wave parts, respectively, whereby the inward bent crest end portion of said raised wave part forms a cross-sectionally concave polyhedral surface comprising on each side one extreme triangular face bounded by one convex folding line joining one crest fold line end of said raised wave part to the edge fold line of said dihedron and by two concave folding lines issuing from one corresponding top fold line end of the inward bent crest end portion of said hollow wave part and joining said crest fold line end of said raised wave part and said edge fold line of said dihedron, respectively, whereas the inward bent crest end portion of said hollow wave part forms said other ridge section in the shape of a cross-sectionally convex polyhedral surface comprising on each side one extreme triangular face bounded by one convex top fold line joining one crest fold line end of said hollow wave part to one meeting point of the inward bent crest end portions of both wave parts, respectively, and by two concave folding lines issuing from the meeting point of said edge fold line of said dihedron with one base fold line and joining said crest fold line end of said hollow wave part and said meeting point of both inward bent crest end portions, respectively.

8. A corner piece according to claim 7, wherein said raised and hollow wave parts have substantially the shape of salient and re-entrant dihedral surface portions, respectively, the edges of which form the respective crests thereof, so that the crest of said raised wave part divides from its end into two sections falling down and away from each other along the two aforesaid convex folding lines, whereas the crest of said hollow wave part divides from its end into two sections falling down and away from one another along the two aforesaid concave folding lines, the inward bent crest end portions of both raised and hollow wave parts forming a re-entrant dihedral surface portion with a concave edge fold line and a salient dihedral surface portion with a convex edge fold line, respectively, thereby defining a tetrahedral re-entrant angle, as viewed from the inside of said dihedron, the vertex of which is the common meeting point of the edge fold lines of said dihedral surface portions, issuing form the respective crest ends of said wave parts.

9. A corner piece according to claim 7, wherein said raised and hollow wave parts have convex and concave cross-sections, respectively, formed by three lateral faces comprising two side faces and a flat crest face defined by two convex fold lines in the raised wave part and by two concave fold lines in the hollow wave part, the crest ends of both raised and hollow wave parts being defined by a transverse convex fold line and by a transverse concave fold line, respectively, so that both crest fold line ends of said raised wave part are joined to the edge fold line of said dihedron by the two aforesaid convex folding lines respectively, whereas both crest line ends of said hollow wave part are joined to said edge fold line of said dihedron by said two concave folding lines, respectively, whereby the mutually adjacent inward bent crest end portions of both raised and hollow wave parts form a cross-sectionally concave polyhedral surface and a cross-sectionally convex polyhedral surface, respectively, having each one a rectangular intermediate face lying between two triangular side faces, said rectangular faces joining along a common transverse concave fold line.

10. A corner piece according to claim 2, wherein each corrugation consists of two hollow wave parts projecting both from the outside of the lateral faces of said dihedron, respectively, and bounded therein by convex base fold lines, so that each crest divides from its end into two aforesaid sections along two concave folding lines, respectively, the inward bent crest end portion of one wave part forming one of said ridge sections with a cross-sectionally convex polyhedral surface including two extreme triangular lateral faces bounded each one by one aforesaid concave folding line and by two convex fold lines issuing from one top fold line end of said one ridge section and joining the edge fold line of said dihedron and one crest fold line end of said one wave part, whereby the top end portion of said one ridge section is bent inwards of the latter so as to form a cross-sectionally concave polyhedral surface including two extreme triangular lateral faces bounded each one by one aforesaid convex fold line and by two concave fold lines issuing from one top fold line end of the other ridge section and joining one top fold line end of said one ridge section and the edge fold line of said dihedron, respectively, whereas the inward bent crest end portion of the other wave part, which forms said other ridge section, consists of a cross-sectionally convex polyhedral surface including two extreme triangular lateral faces bounded each one by one convex top fold line issuing from one crest fold line end of said other wave part and by one aforesaid concave folding line and also by one aforesaid concave fold line, the two latter issuing from the meeting point of one base fold line with the edge fold line of said dihedron, so that said other ridge section extends endwise into said cross-sectionally concave polyhedral surface terminating said one ridge section, the top of said one ridge section thus dividing from its end into two sections falling down to the edge fold line of said dihedron along two convex fold lines, respectively, whereas the top of said other ridge section divides from its end into two sections falling down to the edge fold line of said dihedron along two concave fold lines, respectively.

11. A corner piece according to claim 10, wherein each wave part has substantially the shape of a re-entrant dihedral surface portion, the edge of which forms the crest thereof, so that each crest divides from its end into two sections falling down and away from each other along said concave folding lines, said one ridge section consisting of a salient dihedral surface portion with a convex edge fold line, merging endwise into a re-entrant dihedral surface portion with a concave edge fold line, whereby both of said salient and re-entrant dihedral surface portions form a tetrahedral surface the vertex of which points toward the inside of said dihedron, whereas said other ridge section consists of a salient dihedral surface portion with a convex edge fold line the end of which is joined to the top fold line end of said one ridge section by a concave fold line.

12. A corner piece according to claim 10, wherein each wave part has a concave quadrangular cross-sectional contour formed by three lateral faces comprising two side faces and a flat crest face defined by two concave fold lines, the crest end of each wave part being defined by a transverse concave fold line, so that both crest fold line ends of each wave part are joined to the edge fold line of said dihedron by the two aforesaid concave folding lines, respectively, whereby each ridge section forms a cross-sectionally convex polyhedral surface having a rectangular intermediate face lying between two triangular side faces and the inward bent top end portion of said one ridge section forms a cross-sectionally concave polyhedral surface having a rectangular intermediate face lying between two triangular side faces and interconnecting the respective top ends of said ridge sections, the top end of said one ridge section being defined by a transverse convex fold line and the top end of said other ridge section being defined by a transverse concave fold line, so that the top of each ridge section divides into the two aforesaid sections issuing from the two top fold line ends, respectively.

References Cited

UNITED STATES PATENTS

| | | | |
|---|---|---|---|
| 1,206,717 | 11/1916 | Kochling | 52—630 |
| 3,118,523 | 1/1964 | Girot | 52—630 |
| 3,217,845 | 11/1965 | Reynolds et al. | 52—630 X |

FOREIGN PATENTS 174,025  3/1953  Sweden.

DAVID J. WILLIAMOWSKY, *Primary Examiner.*

A. I. BREIER, *Assistant Examiner.*